3,034,929
CELLOPHANE COATING COMPOSITION
Walter T. Koch, Drexel Hill, Pa., assignor to American Viscose Corporation, Philadelphia, Pa., a corporation of Delaware
Filed Oct. 23, 1957, Ser. No. 691,829
9 Claims. (Cl. 117—145)

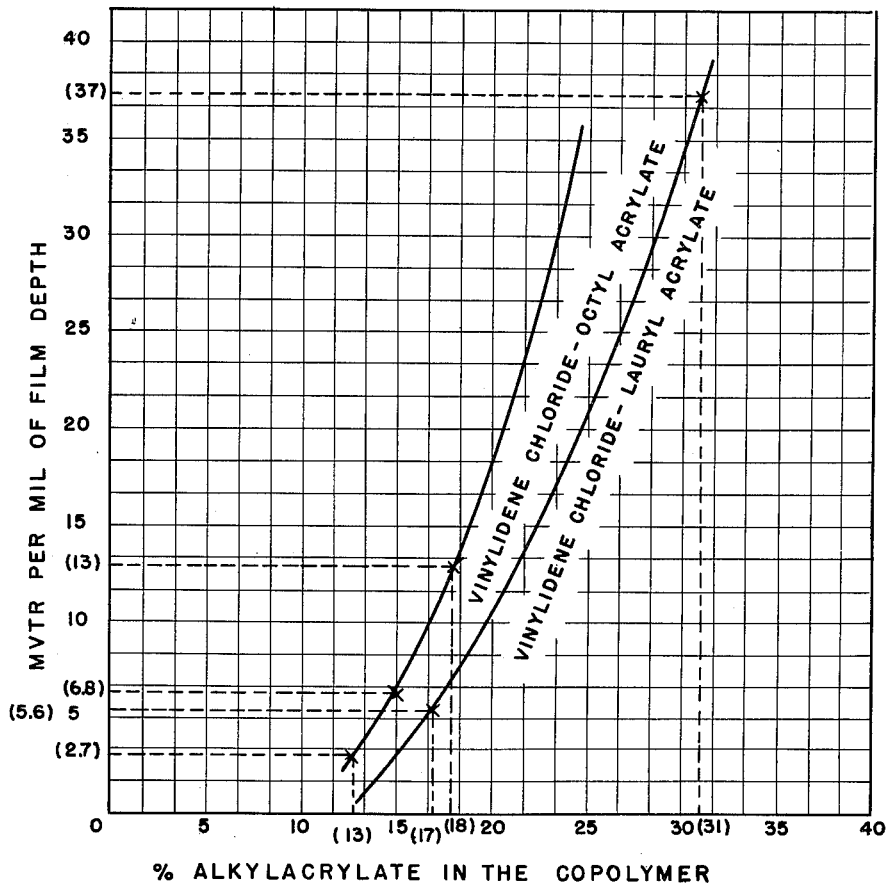

This invention is directed to the production of film-forming compositions, especially for use in the coating of cellulose films such as cellophane. More specifically it relates to binary copolymers of 80% or more by weight vinylidene chloride $H_2C=CCl_2$, and an alkyl acrylate

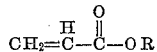

in which the alkyl radical, R, is from 6 to 18 carbon atoms, such copolymers being applied to cellophane as a resinous coating.

The preparation of coated composition for vinylidene copolymers broadly is known in the prior art, the earliest patents typical of this field being U.S. 2,160,945, 2,278,-415 and 2,334,236. More recently, copolymers of vinylidene chloride have been applied to polyethylene terephthalate (U.S. 2,762,720). In addition, the preparation of copolymers of vinylidene chloride and 8-18 carbon alkyl methacrylates as cellophane coating materials is described in a copending application to Walter T. Koch, Serial No. 642,939, filed February 28, 1957. Another related patent application is that of Cornwell et al., Serial No. 677,781, filed August 12, 1957.

The object of the present invention is to improve over the compositions described in the prior art. A further object of this invention is to prepare a film for cellophane which has a good toluene solubility, low MVTR (moisture vapor transmission rate), good clarity, and is non-blocking, i.e., will not stick to adjacent layers when stacked.

In accordance with this invention, vinylidene chloride is copolymerized with an alkyl acrylate in which the alkyl radical is 6–18 carbon atoms, in such proportions that the vinylidene chloride constitutes at least 80% by weight of the copolymer. The resulting copolymer is soluble in toluene and hence can readily be applied to cellophane by existing machinery wherein a running length of cellophane film passes through a coating tank containing, or under a spray of, a solution of the coating composition, after which the film is dried and the toluene or other solvent is recovered for reuse.

While U.S. 2,160,945 and British 524,975 disclose copolymers of vinylidene chloride and 1–5 carbon alkyl acrylates, these are unsuitable for cellophane coatings because they require greater amounts of anti-blocking agents to give a non-blocking coating composition; in other words, these copolymers are too soft.

U.S. 2,334,236 describes coating cellophane with copolymers of 40–80% vinylidene chloride and alkyl acrylates broadly. However, such copolymers form soft coatings on the cellophane film when dry, requiring large amounts of anti-blocking agent. I have discovered that when the alkyl radical of the alkyl acrylate is from 6–18 carbon atoms in length, a harder film is formed on the cellophane sheet than would be the case if using the same percentage of a lower alkyl acrylate, thus requiring less antiblocking agent. In addition the use of the long chain acrylates of this invention permits the use of larger amounts of wax than could be employed in the case of the short chain (1–5 carbon) acrylates. At least 5% wax by weight based on the polymer weight can be employed when the polymer contains these 6–18 carbon alkyl radicals without causing "blushing" or the effect of cloudiness in the film. It has also been found that the less the amount of alkyl acrylate added, the lower is the MVTR of the film. As used in this specification, MVTR is the grams of water passed in 24 hours per square meter of film area at 100° F. and 95% relative humidity. The relation between MVTR and acrylate content of the coating is illustrated well in the graph, which plots MVTR against acrylate content in the copolymer over the narrow range indicated. This range is limited to a composition of copolymer comprising 81–87% by weight of vinylidene chloride with 13–19% by weight of the aforesaid alkyl acrylates. With less than 13% acrylate in the copolymer the latter would not dissolve in toluene alone but requires a toluene-tetrahydrofuran solvent for the 10–13% range of acrylate in the copolymer. If the acrylate content of the copolymer moves below 10% by weight, it is practically insoluble.

The preferred alkyl acrylates are hexy, octyl, 2-ethylhexyl, decyl, and lauryl. The acrylates having an odd number of carbons in the alkyl group are not readily available on the market and hence are of less interest.

While a small amount of anti-blocking agent may be added, too much will impair the other properties of the cellophane such as MVTR and clarity. For example, a water-wettable clay would absorb water and hence increase the MVTR of the film, causing haziness if used in larger amounts. As the amount of alkyl acrylate in the polymer increases, it may be advisable to utilize a non-waxy material, such as one of the inorganic finely divided minerals to render the composition completely anti-blocking. Anti-blocking may be achieved with lower percentages of these latter materials and to an extent which does not visibly affect the transparency of the film. Among the fine particle inorganic materials that may be used as anti-blocking agents are silica, glass powder, aluminum hydrate, talc, chalk, barium, sulfate, magnesium carbonate, micro-mica, and other mineral powders or metallic salts which are chemically inert and insoluble in the compositions and solutions thereof of this invention. However, it should be understood that the inclusion of the anti-blocking agent is only necessary where the films or sheets will be placed in contact with each other or rolled, and that the invention includes polymers containing the higher alkyl acrylate contents without an anti-blocking agent for use where blocking is not a problem.

A primary advantage of the polymers described herein is that they are readily soluble in toluene which has a relatively low cost. Polyvinylidene chloride would be otherwise satisfactory as a coating but is insoluble in conventional solvents. It is necessary, therefore, that the vinylidene chloride be copolymerized with a monomer which will have good solubility in toluene so as to require as little as possible of the more expensive acrylate. These polymers are also soluble in tetrahydrofuran, xylene, dioxane, methyl isobutyl ketone, and butyl acetate, all of which are commercially available. Solutions of the vinylidene chloride-alkyl acrylate polymers described herein of from about 5–25% concentration may be used for coating and film formation, however, it is generally preferred to use concentrations of about 10–20% polymer by weight of total solution. Where the polymers are applied as a film to a regenerated cellulose base material, the film coating is generally in the order of about 5–20% by weight of the coated base sheet. The thickness of the coating may range from 0.1–0.5 mil.

As is the case generally in attempting to coat cellulosic films with vinyl resins, the polymers herein described have better cohesion with the base film if the base film contains one of the so-called anchoring agents. Typical of the materials are the incompletely condensed condensation polymers of melamine formaldehyde, urea, formaldehyde, and resorcinol formaldehyde.

The coating may be added in accordance with any known coating technique. It may be applied by passing the base film through a bath containing the coating composition, in a continuous manner or in a batch manner. The coating may also be sprayed on the film, or applied manually by brushing or the like. The temperature of the coating composition when applied should not exceed about 70° C.

The films are of greatest utility in the field of food packaging, particularly packaging frozen foods such as poultry, fruits and vegetables, which are to be stored for extended periods of time. The film may also be used to wrap hardware items, greased or untreated machine parts and other materials which must be kept free from moisture. Multiple packages, for example for wrapping individual servings of loose food products such as crackers, nuts, cereals, etc., are another use for the film. Sheets or tubes of the coated, heat-shrinkable film may be used in bundling applications for holding together several packages of cigarettes, small boxes of cereals, crackers, etc.

While the invention contemplates the use of the copolymers as the essential constituents of the coatings, other ingredients may be added. The addition of pigments, dyes, delustrants, plasticizers, etc., is therefore understood to be within the purview of this invention.

*Example I*

The continuous redox activated polymerization process was used to prepare a copolymer in 90.5% conversion from a monomer solution which contained 84.5 parts by weight vinylidene chloride and 15.5 parts by weight octyl acrylate. The product emulsion was coagulated with 8% aluminum sulfate solution. The coagulated polymer was purified in the usual manner, i.e., by washing with water and 2-propanol.

A 10% solution of the polymer in warm toluene was applied to regenerated cellulose. The resulting film exhibited slight block. The addition of 3% (of the total solids) paraffin wax and 1% clay dispersion resulted in a block-free film. The film without paraffin had an MVTR of 34 g./m.$^2$ for the second 24 hours whereas the paraffin containing film had an MVTR of 5.3 g./m.$^2$. The total coating thickness was 0.2 mil in the first case and 0.3 mil in the second.

*Example II*

A vinylidene chloride-octyl acrylate copolymer was prepared in a 96½% conversion yield by the process of Example I employing a monomer solution containing 13.6% octyl acrylate and 86.4% vinylidene chloride. A 10% solution of the copolymer in warm toluene applied to a regenerated cellulose film resulted in a MVTR of 8.3 g./m.$^2$/24 hours. The total coating thickness was 0.15 mil and it gave a good heat seal on anchored stock. The addition of 3% wax and 1% clay dispersion lowered the MVTR to 8.8. The films exhibited no blocking.

*Example III*

A copolymer was prepared in a 97% conversion yield from a monomer solution containing 18% by weight octyl acrylate and 82% by weight vinylidene chloride using the process of Example I. A 10% solution of this copolymer in toluene was applied to a regenerated cellulose film in amounts sufficient to form a 0.3 mil total coating thickness. The MVTR of this film was 43 and the heat seal was excellent. The addition of 3% wax and 1% clay lowered the MVTR to 4.7 and made the coating block-free.

*Example IV*

A copolymer was prepared in a 78% conversion yield from a monomer solution of 17% by weight lauryl acrylate and 83% by weight vinylidene chloride using the procedure of Example I. When a 10% solution of this copolymer in toluene was applied to a regenerated cellulose film to form an 0.25 mil coating thickness, the MVTR was 22 and the film was non-blocking. The addition of 3% wax and 1% clay lowered the MVTR to 4.2.

I claim:

1. A method of coating regenerated cellulose film which comprises dissolving from 5 to 25% by weight of a toluene-soluble, non-blocking, self-plasticizing binary interpolymer of from about 81 to 87% by weight of vinylidene chloride and a $C_6$-$C_{13}$ alkyl acrylate, in an organic liquid containing as a solvent a predominant amount of toluene, applying the formed solution to the surface of said regenerated cellulose film, and drying said film whereby the organic solvent is evaporated and said film is coated with a non-blocking, self-plasticizing material.

2. The method of claim 1 wherein the alkyl acrylate is octyl acrylate.

3. The method of claim 1 wherein the alkyl acrylate is stearyl acrylate.

4. The method of claim 1 wherein the alkyl acrylate is lauryl acrylate.

5. The method of claim 1 wherein the alkyl acrylate is decyl acrylate.

6. The method of claim 1 wherein the alkyl acrylate is 2-ethylhexyl acrylate.

7. The method of claim 1 wherein from 10 to 20% by weight of the interpolymer is dissolved in the organic solvent.

8. The method of claim 1 wherein from about 0.5 to 5% by weight of a hydrocarbon wax is dissolved in the solvent.

9. The method of claim 8 wherein about 1% of a clay material is added to the solution.

References Cited in the file of this patent

UNITED STATES PATENTS

| | | |
|---|---|---|
| 2,334,236 | Arnold | Nov. 16, 1943 |
| 2,525,671 | Hauser | Oct. 10, 1950 |
| 2,649,439 | Brown | Aug. 18, 1953 |
| 2,748,027 | Meir | May 29, 1956 |
| 2,762,720 | Michel | Sept. 11, 1956 |
| 2,843,574 | Jordan et al. | July 15, 1958 |